(12) United States Patent
Milekovic (10) Patent No.: US 11,466,716 B2
(45) Date of Patent: Oct. 11, 2022

(54) LOAD COUPLING

(71) Applicant: CUSTOM MADE PRODUCT DEVELOPMENT PTY LTD, Revesby (AU)

(72) Inventor: Peter Milekovic, Revesby (AU)

(*) Notice: Subject to any disclaimer, the term of this patent is extended or adjusted under 35 U.S.C. 154(b) by 670 days.

(21) Appl. No.: 15/575,364

(22) PCT Filed: May 31, 2016

(86) PCT No.: PCT/AU2016/050427
§ 371 (c)(1),
(2) Date: Feb. 18, 2020

(87) PCT Pub. No.: WO2016/191805
PCT Pub. Date: Dec. 8, 2016

(65) Prior Publication Data
US 2020/0347866 A1 Nov. 5, 2020

(30) Foreign Application Priority Data
May 31, 2015 (AU) .................... 2015902027

(51) Int. Cl.
*F16B 7/20* (2006.01)
*F16B 21/04* (2006.01)
*B25B 27/02* (2006.01)

(52) U.S. Cl.
CPC .............. *F16B 7/20* (2013.01); *B25B 27/023* (2013.01); *F16B 21/04* (2013.01)

(58) Field of Classification Search
CPC ................ B25B 27/062; B25B 27/023; Y10T 29/53857; Y10T 29/53883; Y10T 29/53861; F16B 7/20; F16B 21/04
See application file for complete search history.

(56) References Cited

U.S. PATENT DOCUMENTS 5,058,256 A * 10/1991 Taylor ................... B25B 27/062
29/260
5,211,211 A * 5/1993 Rubino ................... B25B 27/02
29/259

(Continued)

*Primary Examiner* — Daniel J Wiley
(74) *Attorney, Agent, or Firm* — Meunier Carlin & Curfman LLC (57) ABSTRACT

In a first aspect there is disclosed a load coupling (10). The load coupling (10) comprises a first coupling member (12) operatively associated with an actuator. The first coupling member has a first coupling formation (16). The load coupling (10) further comprises a second coupling member (14) adapted for operative coupling with the first coupling member (12). The second coupling member (14) includes an attachment formation (15) operatively adapted to attach the second coupling member (14) to a target component to which force generated by the actuator is to be transferred. The second coupling member (14) defines a second coupling formation (24) operatively associated with the first coupling formation (16) of the first coupling member (12). The first coupling formation (16) has (i) a secure orientation relative to the second coupling formation (24) in which the first coupling member (12) is secured to the second coupling member (14) and (ii) a release orientation relative to the second coupling formation (24) in which the first coupling member (12) is adapted to be removed from the second coupling member (14).

13 Claims, 8 Drawing Sheets

(56) References Cited

U.S. PATENT DOCUMENTS

| | | | | |
|---|---|---|---|---|
| 6,006,411 A * | 12/1999 | Kilgore | .................. | B25B 27/06 29/263 |
| 7,698,794 B2 * | 4/2010 | Cobzaru | ................ | B21J 15/043 29/256 |
| 7,980,604 B2 * | 7/2011 | Punaro | .................. | B25B 27/062 29/270 |
| 8,256,081 B2 * | 9/2012 | Fridman | ............... | B25B 27/062 29/244 |

* cited by examiner

LOAD COUPLING

FIELD

The invention concerns a load coupling, particularly but not exclusively, a load coupling for use in a puller assembly.

BACKGROUND

In industrial terms a puller is a device used for separating two components secured by, for example, a press fit and which cannot be separated by hand. One typical application of pullers in industry is that of the removal of pulleys from shafts. Various types of pullers are commercially available. Such pullers employ either hydraulic, pneumatic, impact, screw jack or a combination of those to generate a required force to assemble or disassemble mechanical components. Pullers tend to be cumbersome to use. In certain instances access can be limited and operators at times tend to compromise on safety and proper use of pullers during a repair operation. Under such circumstances the risk of injury to an operator and damage to components being worked on can be considerable.

Another drawback associated with commercially available puller kits is that they tend to be sized for specific applications, with the result that a technician may require a range of puller kits for each different application. Yet a further drawback is that technicians who require specific puller configurations may struggle to obtain a suitably sized puller for their particular application. While accessories are commercially available to complement existing pullers in order to provide a greater range of applications, such accessories tend to be operationally limited, difficult to use and often require a large amount of time to be properly configured for use.

OBJECT

It is the object of the present invention substantially to overcome or at least ameliorate one or more of the above problems encountered with commercially available pullers, particularly pullers employed in industry.

SUMMARY

According to a first aspect of the present invention there is disclosed herein a load coupling comprising:
 a first coupling member operatively associated with an actuator, the first coupling member having a first coupling formation; and
 a second coupling member adapted for operative coupling with the first coupling member, the second coupling member including an attachment formation operatively adapted to attach the second coupling member to a target component to which force generated by the actuator is to be transferred,
 wherein the second coupling member defines a second coupling formation operatively associated with the first coupling formation of the first coupling member, the first coupling formation having (i) a secure orientation relative to the second coupling formation in which the first coupling member is secured to the second coupling member and (ii) a release orientation relative to the second coupling formation in which the first coupling member is adapted to be removed from the second coupling member.

Preferably the first coupling member defines a first passage and the second coupling member defines a second passage, the first and second passages operatively adapted to align when the first and second coupling members are coupled so as to provide an actuator passage adapted to permit movement therethrough of an elongate actuator member associated with the actuator.

Preferably the first coupling member longitudinally extends about a first coupling member axis and the second coupling member longitudinally extends about a second coupling member axis, wherein the first and second coupling member axes are parallel orientated when the first and second coupling members are coupled.

Preferably the first and second coupling members are co-axially orientated when coupled.

Preferably the first coupling member includes a first stop formation and the second coupling member includes a second stop formation operatively associated with the first stop formation, the first and second stop formations operatively adapted to deter axial movement of the first coupling member relative to the second coupling member, when the first coupling member is coupled to the second coupling member.

Preferably the first stop formation comprises a transverse shoulder on an outer surface of the first coupling member and the second stop formation comprises a contact surface, the shoulder operatively adapted to abut the contact surface so as to deter axial movement of the first coupling member relative to the second coupling member.

Preferably the first and second coupling formations are adapted such that the first coupling member undergoes pivotal movement relative to the second coupling member when the first coupling formation is moved between the secure orientation and the release orientation.

Preferably the second coupling member comprises an arrest formation adapted to limit pivotal movement of the first coupling member relative to the second coupling member.

Preferably the arrest formation comprises at least one protrusion adapted to limit pivotal movement of the first coupling member relative to the second coupling member.

Preferably the first coupling formation comprises at least one male member and the second coupling formation comprises at least one complemental female passage.

Preferably the at least one female passage has an inserting portion and a locking portion, the at least one male member operatively adapted to be orientated so as to pass through the inserting portion and be located within the locking portion, the first and second coupling members being coupled when the at least one male member is located within the locking position of the at least one female passage.

Preferably the first coupling member comprises at least one first locking formation operatively associated with at least one second locking formation of the second coupling member, the at least one first and the at least one second locking formations adapted to co-operate to secure the first coupling formation in the locking position.

Preferably the at least one first locking formation comprises a first biased locking member moveable between an expanded locking position and a compressed unlocking position and the at least one second locking formation comprises a locking recess adapted to allow the first biased locking member to be located in its expanded locking position.

Preferably the first coupling member comprises three biased locking members and the second coupling member comprises three corresponding locking recesses.

Preferably the attachment formation comprises at least one arm having a hook for attaching the second coupling member to the target component.

Preferably the at least one arm is movable between an arm attachment position in which the hook attaches the at least one arm to the target component and an arm release position in which the hook is adapted to be released from the target component.

BRIEF DESCRIPTION OF THE DRAWINGS

Preferred embodiments of the invention will be described hereinafter, by way of examples only, with reference to the accompany drawings, in which.

DESCRIPTION OF PREFERRED EMBODIMENTS

Figure 1:
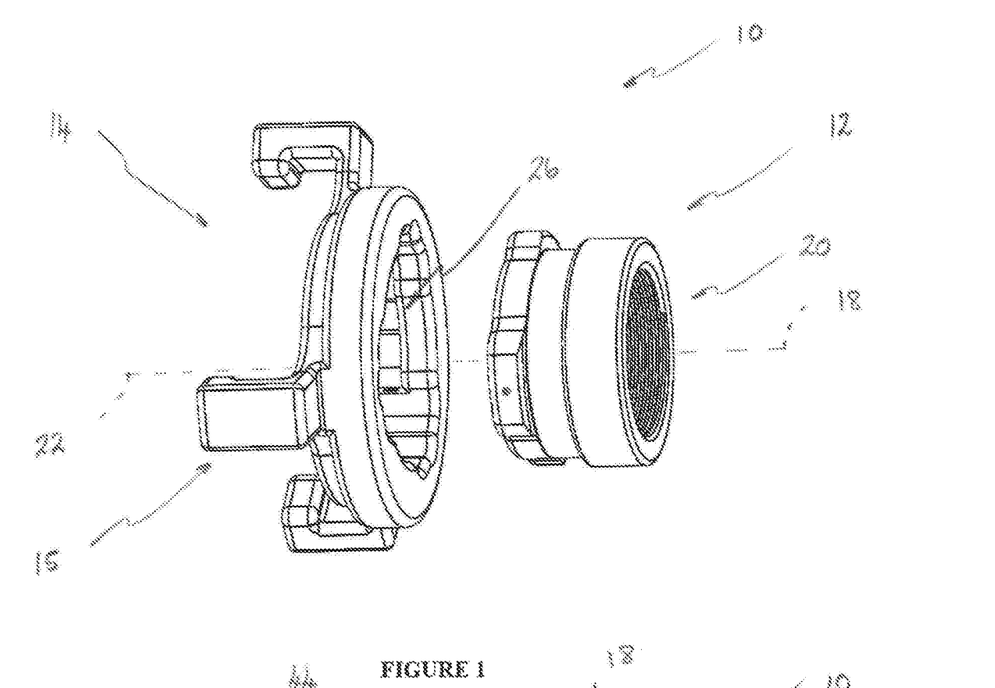
FIG. 1 is an exploded perspective view of a first embodiment load coupling showing a first coupling member and a corresponding second coupling member.
Figure 2:
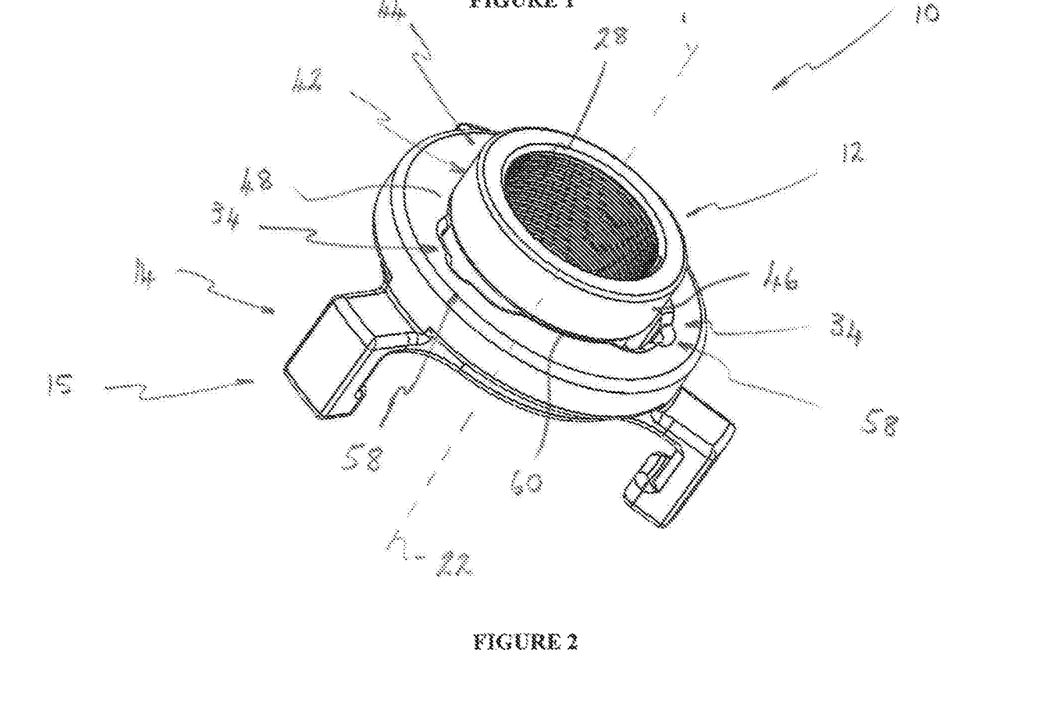
FIG. 2 is a perspective view of the first embodiment load coupling wherein the first coupling member is coupled to the second coupling member.

FIG. 1 and FIG. 2 show an embodiment load coupling, generally indicated with the reference numeral 10. The load coupling 10 comprises a first coupling member 12 and a second coupling member 14. The first coupling member 12 is in use coupled to a non-illustrated actuator, typically an hydraulic cylinder, while the second coupling member 14 includes an attachment formation 15 adapted to be attached to a non-illustrated target component to which a force, generated by the actuator, is to be transferred. In this particular embodiment the load coupling 10 is to be employed in a puller assembly wherein the target component is a push fit pulley which is to be removed from a shaft.

Figure 3:
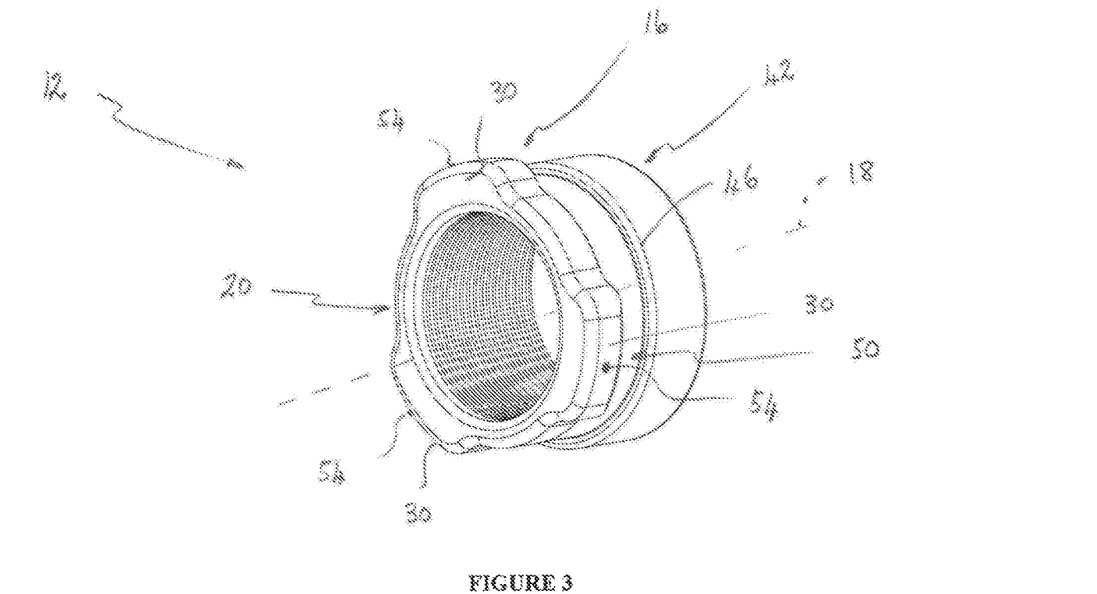
FIG. 3 is a perspective view of the first coupling member of FIG. 1.

The first coupling member 12, shown in FIG. 3, comprises a first coupling formation 16. The first coupling member 12 longitudinally extends about a first coupling member axis 18 and defines a threaded first passage 20 for, in use, threadingly engaging a corresponding threaded portion on a non-illustrated hydraulic cylinder actuator.

Figure 4:
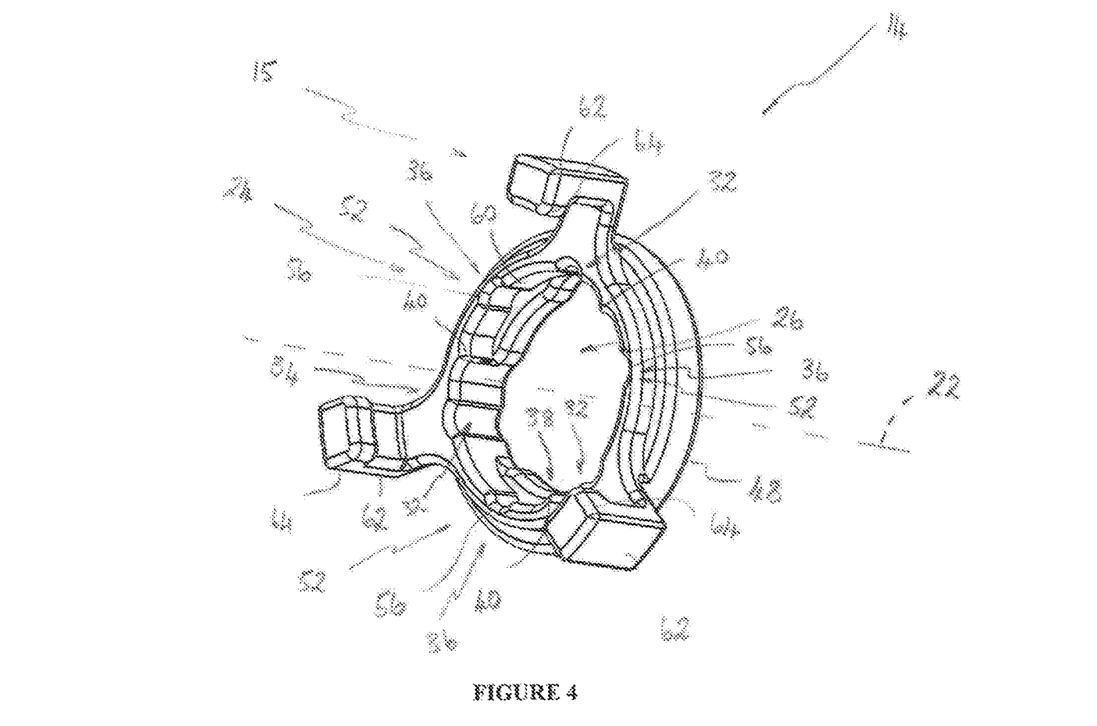
FIG. 4 is a perspective view of the second coupling member of FIG. 1.

The second coupling member 14, shown in FIG. 4, extends longitudinally about a second coupling member axis 22. As shown in FIG. 1 and FIG. 2, the first and second coupling members 12 and 14 are co-axially configured when coupled. The second coupling member 14 defines a second coupling formation 24 operatively associated with the first coupling formation 16 of the first coupling member 12. Interior surfaces of the second coupling member 14 define a second passage 26. The first and second passages 20 and 26 are operatively adapted to align when the first and second coupling members 12 and 14 are coupled so as to provide an actuator passage 28, shown in FIG. 2. In use the actuator passage 28 will enable reciprocating movement through the load coupling 10 of a non-illustrated elongate actuator member of the actuator. The elongate actuator member, for example, may be connected to a piston of the hydraulic cylinder actuator.

The first coupling formation 16 comprises three male members 30, shown in FIG. 3, while the second coupling formation 24 comprises three complemental female passages 32, shown in FIG. 4. Each female passage 32 has an inserting portion 34 and a locking portion 36. Each male member 30 is adapted to be orientated so as to undergo axial movement along the coupling member axis 22 so as to be inserted into a corresponding inserting portion 34 of the of the second coupling member 14. In this position the first coupling member axis 18 and the second coupling member axis 22 are co-axially aligned. The first coupling member 12 can thereafter be pivoted about the first coupling member axis 18 thereby causing the male members 30 to be located within the locking portions 36 of their associated female passages 32. The first and second coupling members 12 and 14 are coupled when the male members 30 are located within the locking portions 34 of their corresponding female passages 32.

Figure 5:
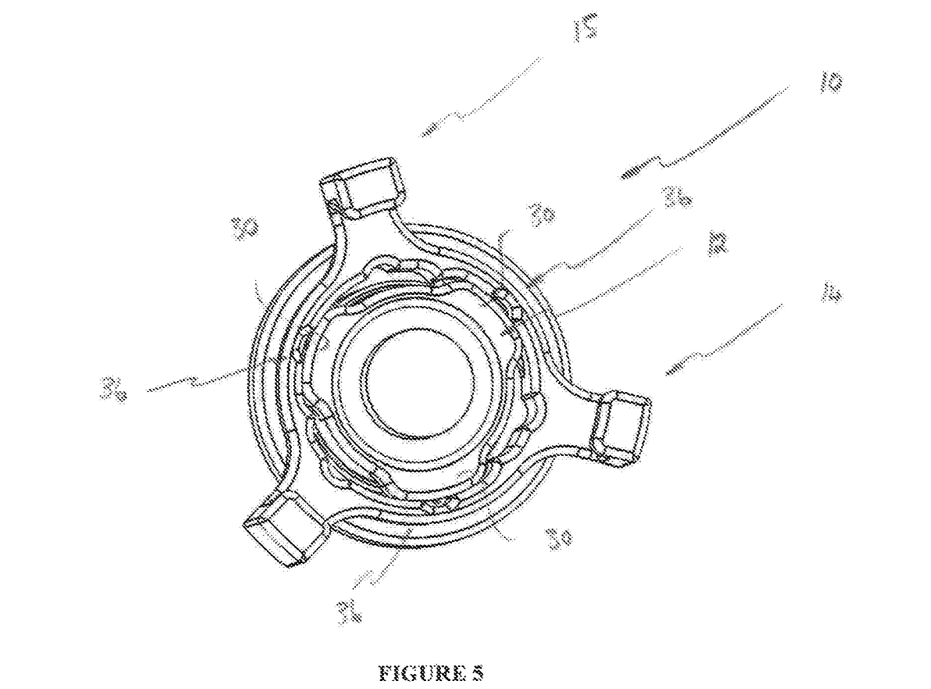
FIG. 5 is a perspective view of the embodiment load coupling of FIG. 1 wherein a first coupling formation of the first coupling member is located in a secure orientation.
Figure 6:
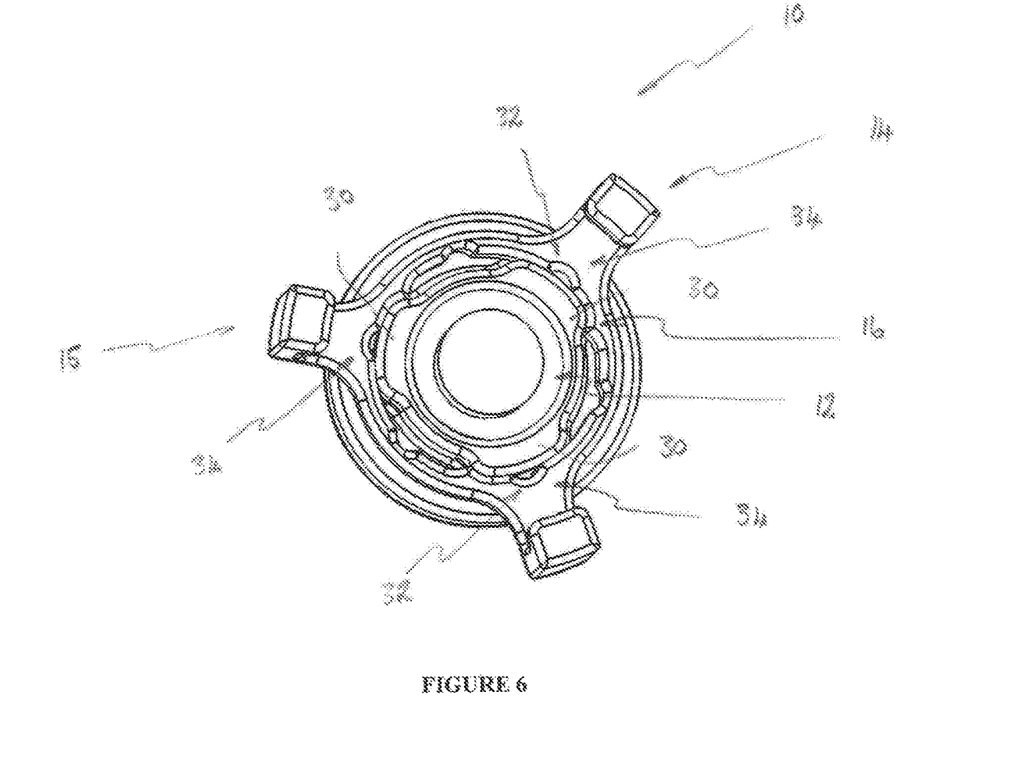
FIG. 6 is a perspective view of the embodiment load coupling of FIG. 1 wherein the first coupling formation is located in a release orientation.

In this embodiment a secure orientation of the first coupling formation 16 is defined when the male members 30 are located within the locking portions 36 of the female passages 32 of the second coupling member 14. The secure orientation is shown in FIG. 5. In the secure orientation the first coupling member 12 is secured to the second coupling member 14. The embodiment further defines a release orientation for the first coupling formation 16, shown in FIG. 6, wherein the first coupling member 12 is adapted to be removed from the second coupling member 14. In the release orientation the male members 30 of the first coupling formation 16 are located within the inserting portions 34 of corresponding female passages 32 of the second coupling member 14. The first coupling member 12 is removed from second coupling member 14 by causing the coupling members 12 and 14 to undergo relative longitudinal axial movement along the second coupling member axis 22.

Referring again to FIG. 4, the second coupling member 14 comprises an arrest formation 38 adapted to limit pivotal movement of the first coupling member 12 relative to the second coupling member 14. The arrest formation comprises three protrusions 40 which extend radially into the second passage 26.

As shown in FIG. 2 and FIG. 3, the first coupling member 12 includes a first stop formation 42 and the second coupling member a second stop formation 44. In this embodiment the first stop formation 42 comprises a transverse shoulder 46 on an outer surface of the first coupling member 12. The second stop formation 44, in turn, comprises a contact surface 48 on an outer face of the second coupling member 14. The shoulder 46 is operatively adapted to abut the contact surface 48 so as to deter axial movement of the first coupling member 12 relative to the second coupling member 14 along the second coupling member axis 22.

FIG. 3 shows the first coupling member 12 as comprising a first locking formation 50. The first locking formation 50 is operatively associated with a second locking formation 52 of the second coupling member 14, shown in FIG. 4. The first and second locking formations 50 and 52 co-operate to secure the first coupling formation 16 in the secure orientation of FIG. 5. The first locking formation 50 comprises three biased locking members 52, each located individually on one of the male members 30. The biased locking members 52 each comprises a spring activated pin moveable between an expanded locking position and a compressed unlocking position. The second locking formation 54, shown in FIG. 4, is provided in the form of locking recesses 56, here in the form of a dimples. Each locking recess 56 is adapted to allow an associated biased locking member 54 to be located in its expanded locking position.

To facilitate location of the biased locking members 54 within their corresponding locking recesses 56, each inserting portion 34 of the female passages 32 includes an insertion recess 58, shown in FIG. 2. The locking members 54 can now in their expanded positions be located within the insertion recesses 58 when the male members 30 are located within the insertion portions 34 of the female passages 32. The second coupling member 14 is internally shaped such that as the first coupling member 12 is caused to pivot about the first coupling formation axis 18, internal surfaces 60 of the second coupling member 14 will cause the locking members 54 to be located in their compressed unlocking positions. Continued pivotal movement of the first coupling member 12 about the first coupling member axis 18 will be arrested by the protrusions 40. The locking recesses 56 are positioned such that when the male members 30 contact the protrusions 40, the locking members 54 are allowed to return to their expanded locking positions and be located within the locking recesses 56. The first coupling member 12 is now secured within the secure orientation of FIG. 5.

The attachment formation 15 of the present embodiment second coupling member 14 comprises three rigid arms 62 that are fixed in position. Each arm 62 includes a hook 64 for attaching the second coupling member 14 to the non-illustrated the target component. In the above example of a pulley, the arms 62 and their hooks 64 are configured such that by manual manipulation by an operator the hooks are adapted to engage the hub of the pulley fitted to a shaft. A pulling force generated by the non-illustrated actuator acting on the first coupling member 12 will be transferred to the second coupling member 14 and its attachment formation 15, such that the pulley can be pulled from the shaft.

Figure 7:
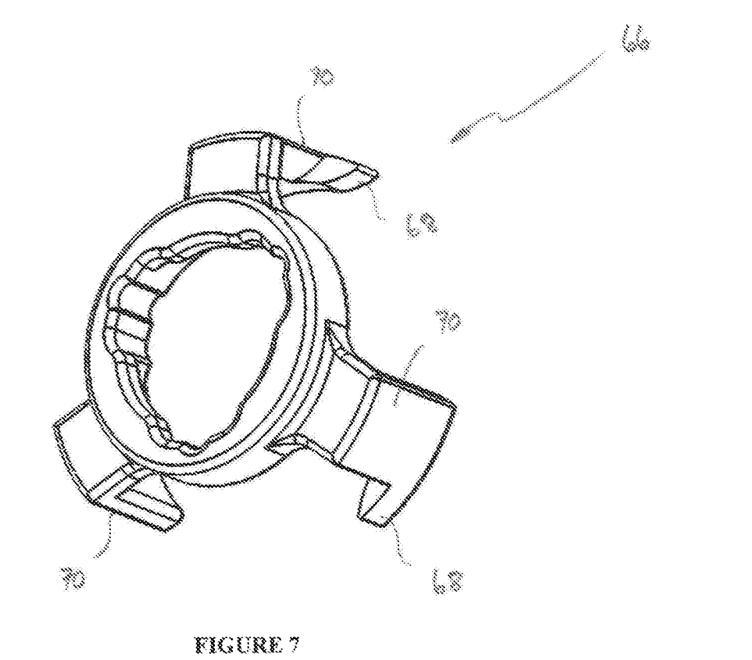
FIG. 7 is a perspective view of a second embodiment second coupling member.

FIG. 7 shows a second embodiment second coupling member 66. The second coupling member 66 includes hooks 68 at the ends of arms 70. The hooks 68 are adapted to be located in a position behind a non-illustrated target component, for example a pulley that is to be removed from a shaft. The configuration of the hooks 68 differ from the hooks 64 of the first embodiment second coupling member 14 in that the hooks 68 enable attachment to a range of target components of different diameter. Typically the hooks 68 will be manoeuvred by an operator through openings in the pulley to be located at a side opposite the position of the actuator. Once the hooks 68 have passed through those openings they are rotated to engage a rear surface of the pulley such that upon activation of the actuator the pulley is pulled from its shaft.

Figure 8:
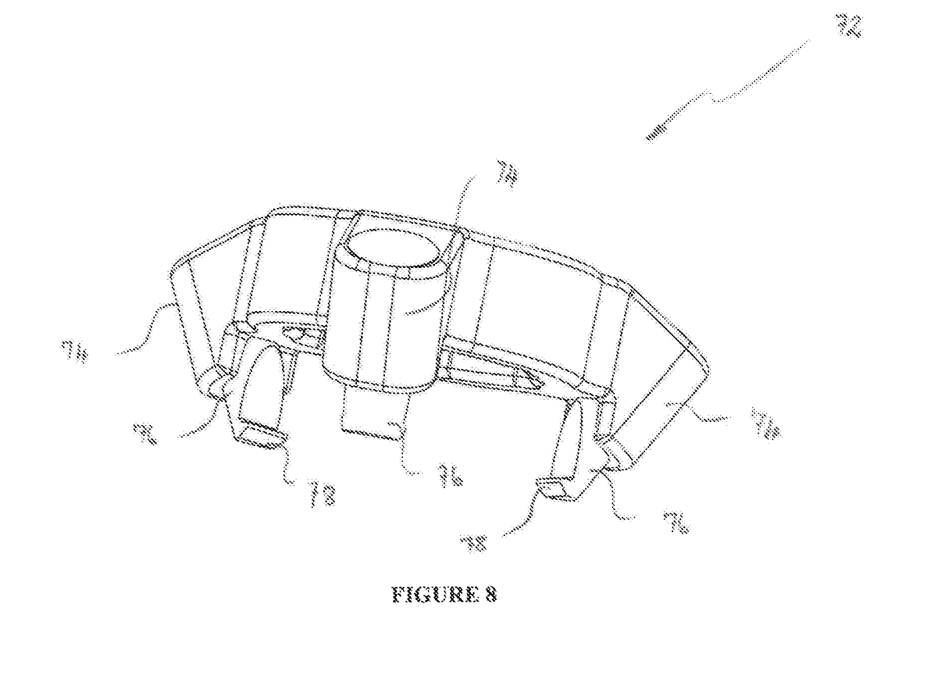
FIG. 8 is a perspective view of a third embodiment second coupling member.

A third embodiment second coupling member 72 is shown in FIG. 8. The second coupling member 72 includes three housings 74. Each housing 74 houses an arm 76. The arms 76 are movable between an extended arm release position shown in FIG. 8, in which a hook 78 of each arm 76 is adapted to be released from a target component. The arms 76 are movable to an arm attachment position in which the arms 76 are retracted into the housings 74 to facilitate attachment to the target component. The arms 76 are biased to a retracted position within the housing 74, with the use of non-illustrated biasing means. The biasing means in this embodiment is provided in the form of helical tension springs located within the housings 74. It will be noted that the housings 74 taper inwardly which ensures that the arms 76 will define a larger diameter when in an extended position than a retracted position when they are retracted into the housings 74. The differences in diameter of the arms 76 enable attachment to and release from a target component. In this embodiment the biasing means is provided in the forms of springs. It will, however, be appreciated that the actuation function of the springs could be automated, semi-automated or manual and that such actuation could be effected by, but is not limited to, screws, solenoids and hydraulic or pneumatic actuation.

Figure 9:
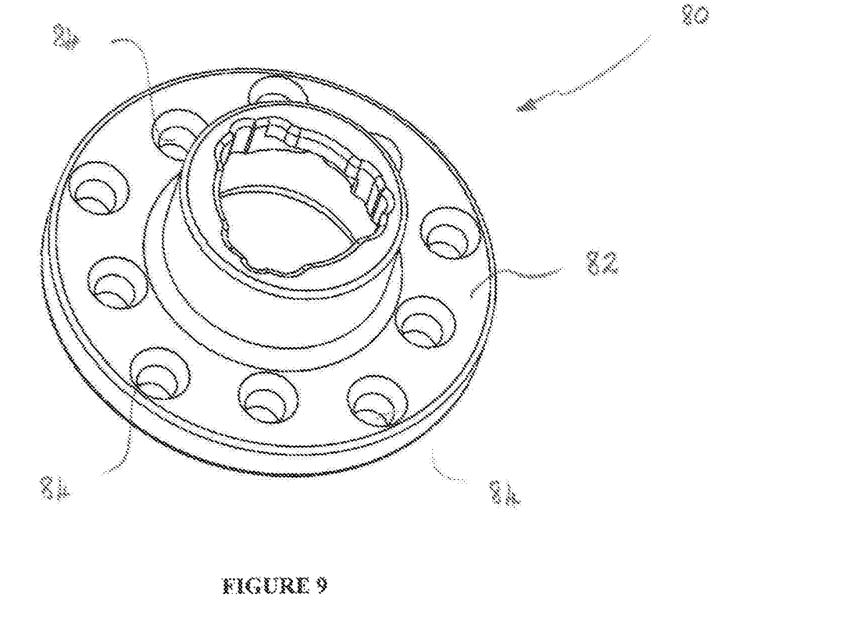
FIG. 9 is a perspective view of a fourth embodiment second coupling member.

FIG. 9 shows a fourth embodiment second coupling member 80. The second coupling member 80 includes a flange portion 82 having holes 84 therein to facilitate attachment and release from a target component.

Figure 10:
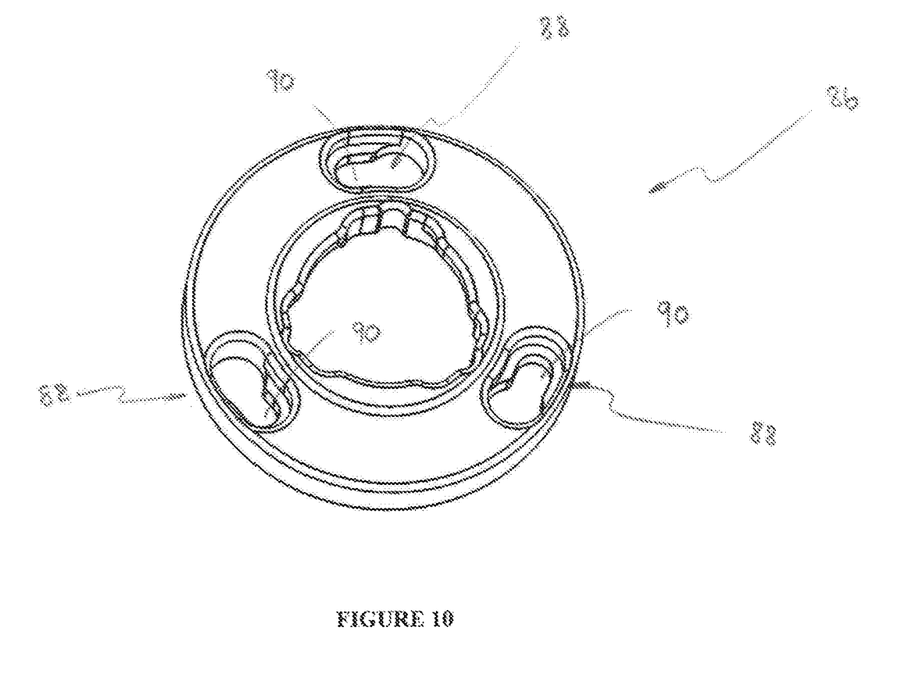
FIG. 10 is a perspective view of a fifth embodiment second coupling member.

FIG. 10 shows a fifth embodiment second coupling member 86. The second coupling member 86 includes three keyholes 88. In use the keyholes 88 are adapted to align with raised bosses or threaded apertures in a target component. In the case of raised bosses the second coupling member 86 is mounted over the raised bosses and rotated to ensure the bosses are held within narrow portions 90 of the key holes 90. In the event where the target component includes threaded apertures bolts are inserted into the apertures to provide a temporary or semi-permanent raised boss to be engaged by the keyholes 88. The manner of application is in effect the same as in the case of the target component having raised bosses.

Figure 11:
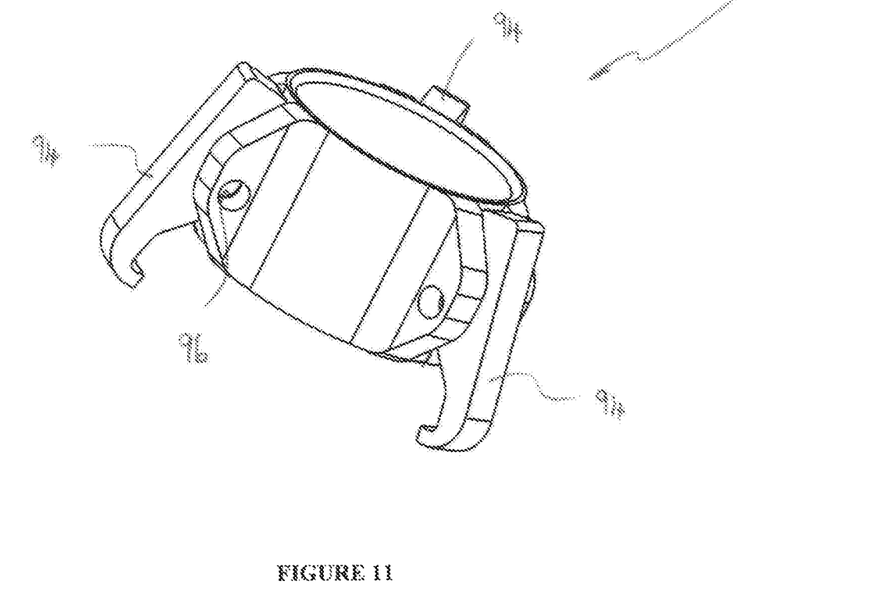
FIG. 11 is a perspective view of a sixth embodiment second coupling member.

A sixth embodiment second coupling member 92 is shown in FIG. 11. The second coupling member 92 includes adjustable arms 94 which are pivotally mounted about pivot pins 96. The arms 94 are actuated between release and attachment positions to facilitate release from and attachment to a target component. Actuation of the arms 94 in this embodiment is effected with non-illustrated springs. It will, however, be appreciated that actuation could be automated, semi-automated or manual. Actuation can further be effected by, but is not limited to, screws, solenoids and hydraulic or pneumatic actuation.

Figure 12:
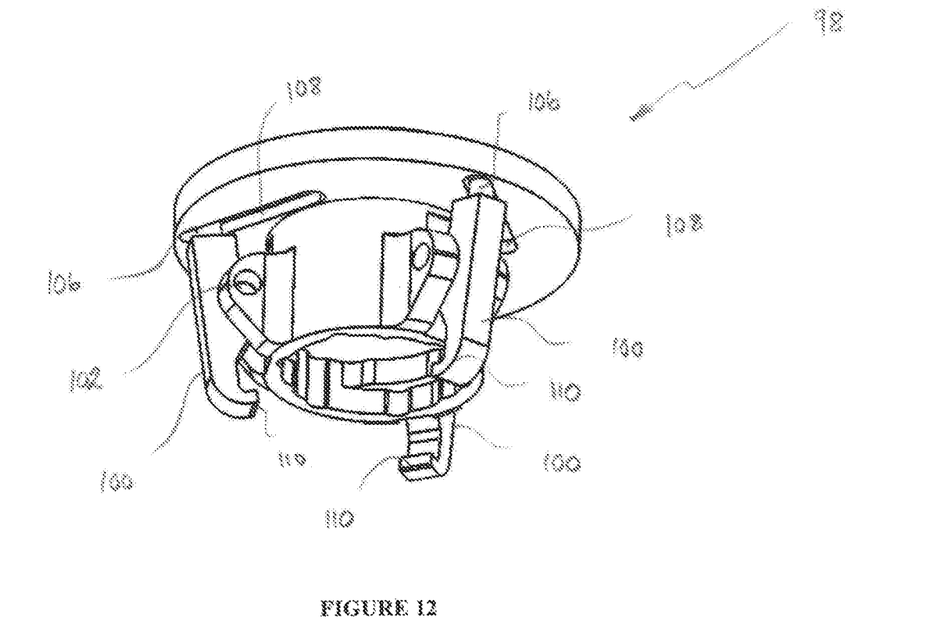
FIG. 12 is a perspective view of a seventh embodiment second coupling member.

FIG. 12 shows a seventh embodiment second coupling member 98. The second coupling member 98 includes adjustable arms 100 which are pivotally mounted about pivot pins 102. The arms 100 are attached to an actuating disc 104 which actuates the adjustable arms 100. Attachment of the arms 100 to the actuating disc 104 is effected by connecting pins 106 of the arms 100 which are located in guide slots 108. The effect of this is that as the actuating disc 104 is rotated the connecting pins 106 are caused to undergo movement along the guide slots 108, in turn causing the arms to undergo pivotal movement about the pivot pins 102. Such movement causes hooks 110 of the arms 100 either to be released from or attached to a target component. Actuation of the actuating disc 104 can be effected automatically, semi-automatically or manually.

Figure 13:
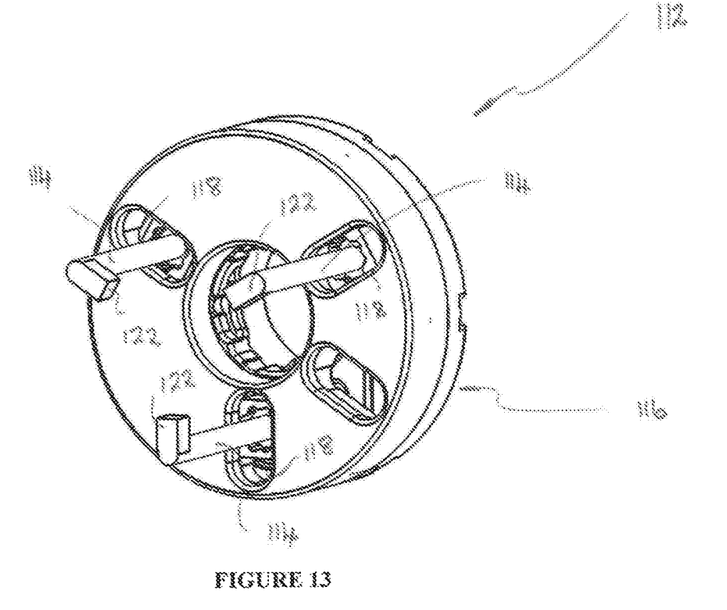
FIG. 13 is a perspective view of an eighth embodiment second coupling member.

An eighth embodiment second coupling member 112 is shown in FIG. 13. The second coupling member 112 includes adjustable arms 114 which are attached to an actuating disc 116. The actuating disc 116 is adapted to actuate the arms 114 between attachment and release positions so as to facilitate attachment to and release from a target component. The arms 116 extend through guide slots 118 in a base member 120. Rotation of the actuating disc 116 will cause the arms 116 to move along the guide slots 118 enabling the arms to be located respectively in release and attachment positions in which hooks 122 are released from or attached to a target component. As is the case for the second coupling member 98, actuation of the actuating disc 116 can be effected automatically, semi-automatically or manually.

Figure 14:
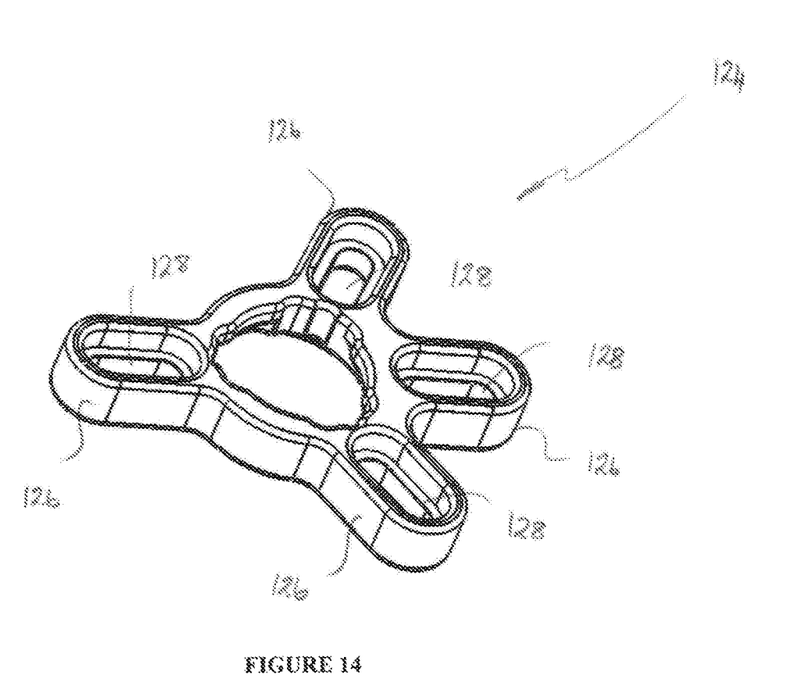
FIG. 14 is a perspective view of a ninth embodiment second coupling member.

FIG. 14 shows a ninth embodiment coupling member 124 comprising a number of arms 126 having slots 128 to facilitate attachment to and release from a target component.

Figure 15:
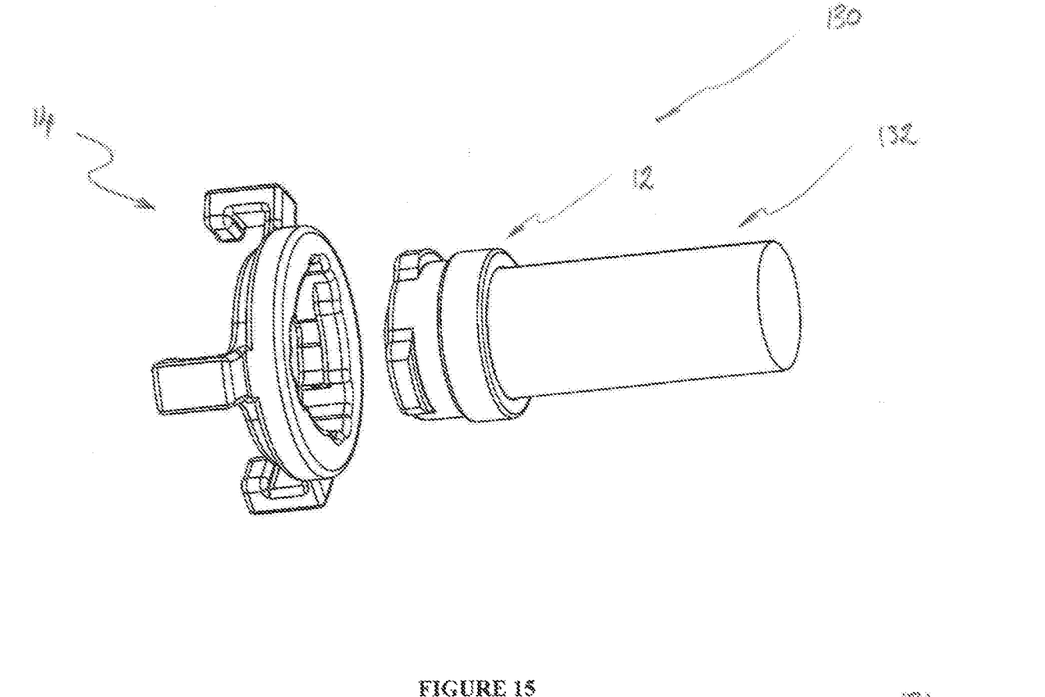
FIG. 15 is a perspective view of an embodiment first coupling member integrally formed with an hydraulic cylinder and oriented to be coupled to a second coupling member.

FIG. 15 shows an alternative load coupling 130 comprising a first and second coupling member 12 and 14. In this embodiment the first coupling member 12 is integrally formed with an actuator hydraulic cylinder 132.

Figure 16:
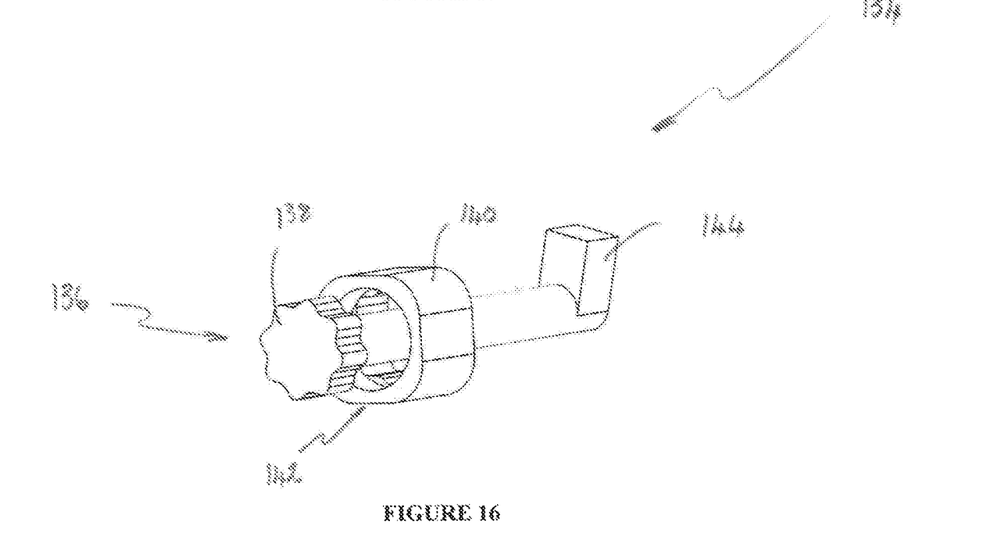
FIG. 16 is a perspective view of an alternative embodiment of an arm for an attachment formation of an embodiment second coupling member.

FIG. 16 shows an adjustable arm 134 which can, for example, be employed in the second coupling member 112 depicted in FIG. 13. In particular the arm 134 includes a locking formation 136 on a head 138 of the arm 134. The arm 134 is operatively associated with a housing 140 and slidably coupled thereto. The housing 140 includes a second locking formation 142. In use the arm 134 can be rotated in a suitable orientation relative to a target component. The arm 134 can then be slid into the housing 140 so that the first locking formation 136 can mate with the second locking formation 142. In this position the locking formation 136 of the arm 134 co-operates with the second locking formation 142 of the housing 140 to deter any further rotation of the arm 134, thereby ensuring that a hook 144 is configured to engage a target component securely.

Although in the above description specific reference is made to an hydraulic actuator it will be readily appreciated that the actuator could take the form of a pneumatic, electric, impact, screw jack or a combination of such actuator systems.

The locking formations employed for securing the first coupling member 12 in its secure orientation can be provided in a range of configurations such as, but not limited to, balls, pins, nuts, locking rings, clips, friction, magnets, electro-magnets, pressure forces or combinations of those.

The above embodiments are produced from high tensile steel. However, it will be appreciated that a range of materials could be employed provided such materials are capable of transmitting a force of a particular magnitude for a specific application.

Although the invention has been described with reference to specific examples, it will be appreciated by those skilled in the art that the invention may be embodied in many other forms.

The invention claimed is:

1. A load coupling comprising:
a first coupling member operatively associated with an actuator, the first coupling member having a first coupling formation; and
a second coupling member adapted for operative coupling with the first coupling member, and being coaxially oriented with the first coupling member when coupled,
the second coupling member including an attachment formation operatively adapted to attach the second coupling member to a target component to which force generated by the actuator is to be transferred, wherein
the second coupling member defines a second coupling formation operatively associated with the first coupling formation of the first coupling member, the first coupling formation having
(i) a secure orientation relative to the second coupling formation in which the first coupling member is secured to the second coupling member, and
(ii) a release orientation relative to the second coupling formation in which the first coupling member is adapted to be removed from the second coupling member,
and wherein the first coupling member includes a first stop formation comprising a transverse shoulder on an outer surface of the first coupling member, and the second coupling member includes a second stop formation comprising a contact surface and being operatively associated with the first stop formation, the first and second stop formations operatively adapted to deter axial movement of the first coupling member relative to the second coupling member, when the first coupling member is coupled to the second coupling member, and the shoulder operatively adapted to abut the contact surface so as to deter axial movement of the first coupling member relative to the second coupling member.

2. The load coupling according to claim 1, wherein the first coupling member defines a first passage and the second coupling member defines a second passage, the first and second passages operatively adapted to align when the first and second coupling members are coupled so as to provide an actuator passage adapted to permit movement therethrough of an elongate actuator member associated with the actuator.

3. The load coupling according to 1, wherein the first and second coupling formations are adapted such that the first coupling member undergoes pivotal movement relative to the second coupling member when the first coupling formation is moved between the secure orientation and the release orientation.

4. The load coupling according to claim 3, wherein the second coupling member comprises an arrest formation adapted to limit pivotal movement of the first coupling member relative to the second coupling member.

5. The load coupling according to claim 4, wherein the arrest formation comprises at least one protrusion adapted to limit pivotal movement of the first coupling member relative to the second coupling member.

6. The load coupling according to any one of the preceding claims, wherein the first coupling formation comprises at least one male member and the second coupling formation comprises at least one complemental female passage.

7. The load coupling according to claim 6, wherein the at least one female passage has an inserting portion and a locking portion, the at least one male member operatively adapted to be orientated so as to pass through the inserting portion and be located within the locking portion, the first and second coupling members being coupled when the at least one male member is located within the locking portion of the at least female passage.

8. The load coupling according to any one of the preceding claims, wherein the first coupling member comprises at least one first locking formation operatively associated with at least one second locking formation of the second coupling member, the at least one first and the at least one second locking formations adapted to co-operate to secure the first coupling member in the secure orientation.

9. The load coupling according to claim 8, wherein the at least one first locking formation comprises a first biased locking member moveable between an expanded locking position and a compressed unlocking position and the at least one second locking formation comprises a locking recess adapted to allow the biased first locking member to be located in its expanded locking position.

10. The load coupling according to claim 9, wherein the first coupling member comprises three biased locking members and the second coupling member includes three corresponding locking recesses.

11. The load coupling according to any one of the preceding claims, wherein the attachment formation comprises at least one arm having a hook for securing the second coupling member to the target component.

12. The load coupling according to claim 11, wherein the at least one arm is movable between an arm attachment position in which the hook attaches the at least arm to the target component and an arm release position in which the hook is adapted to be released from the target component.

13. The load coupling according to claim 12, wherein the at least one arm is movable between an arm attachment position in which the hook attaches the at least arm to the target component and an arm release position in which the hook is adapted to be released from the target component.

* * * * *